United States Patent [19]

Messer

[11] 4,427,729
[45] Jan. 24, 1984

[54] GLUE CHIPPED GLASS AND METHOD
[76] Inventor: John A. Messer, P.O. Box 648, Greer, S.C. 29651
[21] Appl. No.: 366,933
[22] Filed: Apr. 9, 1982
[51] Int. Cl.$^3$ .................... B32B 17/10; B44C 1/22
[52] U.S. Cl. .................................. 428/141; 65/60.3; 427/407.2; 427/428; 428/38
[58] Field of Search .................. 118/259, 262; 427/407.2, 428; 428/38, 141; 65/60.3

[56] References Cited
U.S. PATENT DOCUMENTS

| | | | |
|---|---|---|---|
| 305,380 | 9/1884 | Ferguson | 428/141 |
| 3,116,166 | 12/1963 | Halley | 118/68 |
| 3,293,067 | 12/1966 | Streb et al. | 427/208 |

Primary Examiner—Henry F. Epstein
Attorney, Agent, or Firm—Dority & Flint

[57] ABSTRACT

A method and apparatus for the automated mass production of glue-chipped glass having a well-defined uniform chipped glass pattern is disclosed which includes pretreating sheets of glass to roughen their surface and then apply a desired amount of glue in a uniform thin layer over the glass by delivering a glue solution to the nip of a pair of rollers where a reservoir of glue is maintained while circulating a heated fluid through the rollers to maintain the glue at a desired temperature. By providing a desired space between the nip of the rollers, the glass sheets being automatically conveyed are coated with a correct amount and thickness of glue layer. The apparatus includes an animal glue solution source (50) and a conveyor (10) for automatically conveying the glass from a glass treating station (20) to an application station (B) whereat a pair of rollers (24, 26) are arranged with a nip (34) therebetween defined by a predetermined space (32) between the rollers. A heated fluid such as water has been found necessary to be circulated through the rollers in order to maintain the properties of the glue such that they can be correctly applied and coated on the glass. The automatic conveyor conveys the glass precisely below the nip of the rollers whereafter the glass is conveyed to an oven (54) where the glue is dried and chips off of the glass to thereby cut the glass and remove portions thereof such that a well-defined chipped glass pattern is created.

5 Claims, 3 Drawing Figures

U.S. Patent   Jan. 24, 1984   4,427,729
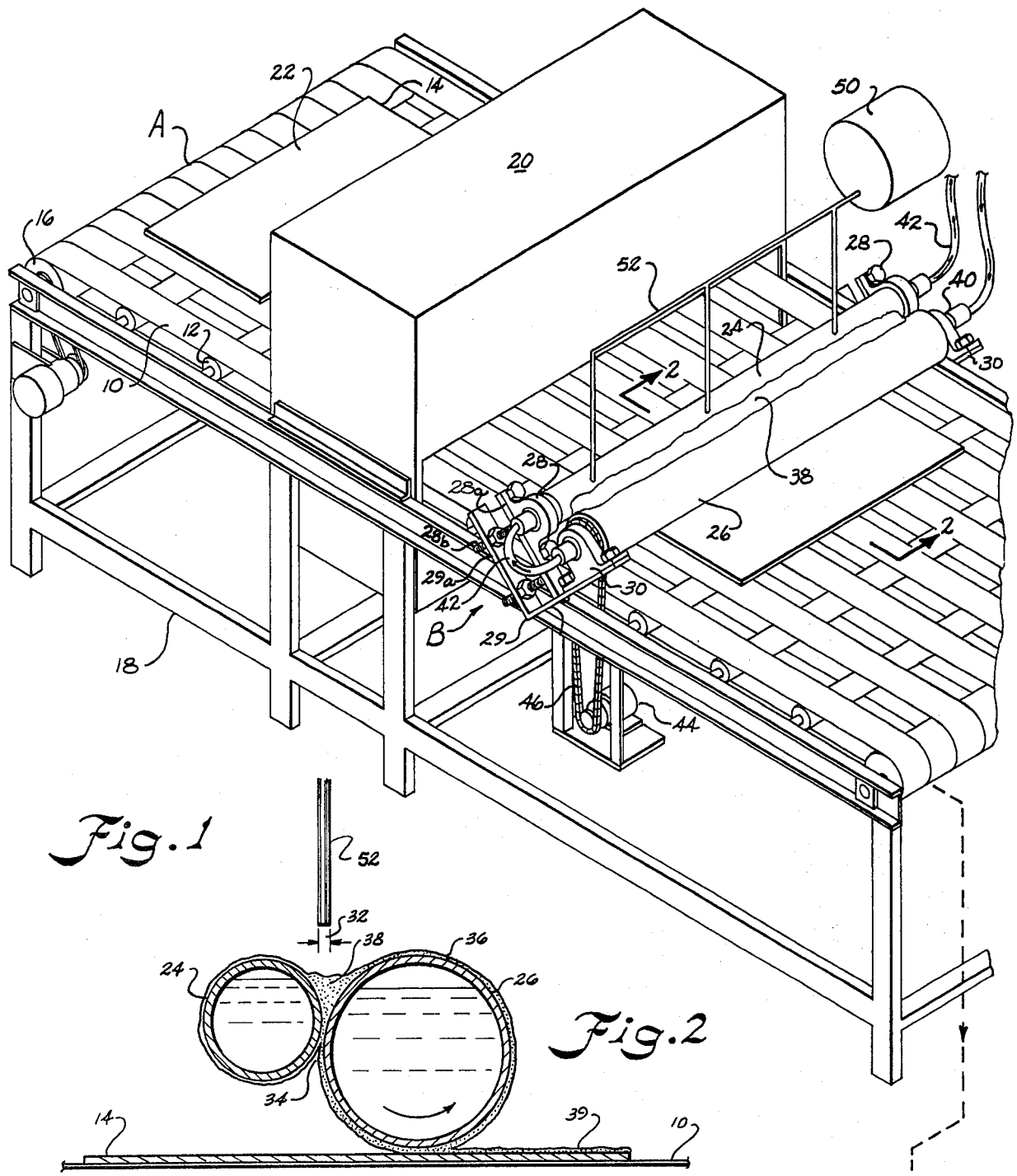
Fig.1
Fig.2
Fig.3

GLUE CHIPPED GLASS AND METHOD

BACKGROUND OF THE INVENTION

The invention relates to the art of glass chipping which is a very old art that has been practiced in the past mainly by applying a solution of animal glue manually to a glass surface which has been lightly roughened. The glue film is then oven dried until the glue chips off the glass surface leaving a cut chipped glass pattern which resembles somewhat that of a fossil pattern. This results in a very attractive decorative sheet of glass which has numerous applications in interior decorating.

Heretofore, there has not been a fully automated process for producing glue-chipped glass. Typically, the glass is prepared by lightly sandblasting the surface of the glass and then manually applying the thin layer of animal glue solution to the glass surface. Many types of hand scraping devices have been utilized to evenly spread the glue solution over the glass surface. However, it is difficult to control the amount of glue spread on the glass surface to provide a uniform film thickness so that a high quality chipped glass is produced. The pattern thus produced may vary widely from sheet to sheet.

The prior methods have not afforded a process in which glue-chipped glass is produced in large quantities in accurately duplicated patterns.

The use of the nip of a pair of rollers to form a reservoir of a coating material is known such as in U.S. Pat. No. 3,293,067. U.S. Pat. No. 3,116,166 discloses a heated coating roller heated by steam. However, the above are generally unrelated and unsuitable to the process of making glue-chipped glass. Due to the fact that the primary parameter in the quality of the chipped glass pattern is the application of the glue solution, such has always been a manual art and it has not been thought that such could be automated to mass produce high quality glue-chipped glass.

Accordingly, an important object of the present invention is to provide a method and apparatus for the automated mass production of glue chipped glass.

Yet another important object of the present invention is to provide a method for producing glue-chipped glass in which a film of glue solution is deposited uniformly over the surface of glass sheets conveyed automatically.

Yet another important object of the present invention is to provide a method for uniformly applying an animal glue solution over a glass surface in which the glue properties are maintained to facilitate rapid automatic mass production.

Still another important object of the present invention is to provide a method and apparatus of producing glue-chipped glass wherein the chipping pattern is uniformly duplicated from one glass sheet to another.

SUMMARY OF THE INVENTION

The above objectives are accomplished according to the present invention by a method of automated mass production for glue chipped glass which includes automatically conveying sheets of glass through a glass treating station where an upwardly facing surface of the glass is lightly sandblasted. The glass is then automatically conveyed to an application station where a source of animal glue solution is provided at a desired heated temperature. At the application station, the apparatus and method include a pair of application rollers arranged to define a nip therebetween. The glue solution is delivered to the nip of the rollers where a reservoir of glue solution is formed. One of the application rollers is driven in rotation in the direction that the glass sheets are conveyed. A heated fluid is passed through both the application rollers during production which heats the rollers to a desired temperature maintainng glue properties adequate for automated mass applications. The rollers are arranged such that a predetermined spacing is created between the rollers at the nip so that a thin layer of glue solution is formed on the rotating roller which is then deposited as a thin uniform film of a desired thickness on the glass surface passing beneath the roller. The glass sheets are subsequently conveyed to a drying oven for heating where the glue chips off of the glass creating a well defined chipped glass pattern.

In the method, heated water is circulated through the glue application rollers at a temperature of about 160 degrees Fahrenheit to maintain proper glue properties facilitating glue solution application for automatic mass production of chipped glass.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating apparatus for carrying out a method of automated glue-chipped glass production according to the present invention, FIG. 2 is a section view taken along line 2—2 of FIG. 1, and FIG. 3 is a plan view of a sheet of glue-chipped glass produced according to the present invention.

DESCRIPTION OF A PREFERRED EMBODIMENT

The invention relates to the art of glue-chipped glass and more particularly to a method and apparatus for automated production of glue-chipped glass which facilitates manufacture of the chipped glass in large quantities of uniformly fine patterned glass sheets. While the art of glue-chipped glass has been in existence for a very long time, there has not been a fully automated process and apparatus for producing this glass and fine chipped pattern thereon.

While there are many control parameters which determine the quality and definition of the fine fossil-like pattern upon the glass, designated generally as G, the primary control lies in depositing upon the glass surface a definite weight of dry glue per square foot of glass. It is generally known that three ounces of dry glue per square foot gives optimum results for securing a uniform chipping of moderate depth of cut and a generally desirable type of medium to fine glass chipping pattern. It is also desirable to pretreat the surface of the glass by lightly sandblasting the surface prior to the application of the glue layer.

Secondarily, the uniformity of results and duplication of results is determined by the drying process of the glue film after application. The glue film needs to be initially gelled by air drying by a general circulation of room temperature air (70–80 degrees Fahrenheit). After the initial air drying, the glass is subjected to dry air temperatures of 125 degrees Fahrenheit preferably in an oven-type dryer. Forced air circulation is not required or recommended in the dryer oven and the oven should breathe sufficiently only to remove the excess moisture. Temperatures as low as 110 degrees Fahrenheit and as high as 140 degrees Fahrenheit have been found satisfactory. Steady, controlled dry air heat of approximately 125 degrees Fahrenheit appears to give the optimum results.

As far as the primary control of the glass-chipping pattern, for purposes of example, a two-to-one concentration and a glue deposition of a 1/16 inch thickness is generally equivalent to the application of three ounces of dry glue per square foot glass area which produces a medium fine glass chipped pattern that is normally desirable.

Referring now to the drawing, the apparatus and method for automated production of glue chipped glass is illustrated which mass produces highly uniform and duplicative glass sheets of a fine chipped glass pattern. The apparatus includes a conveyor A having a plurality of conveyor belts 10 carried about rollers 12 for conveying sheets of glass 14. Any suitable conveyor may be utilized for conveying the glass sheets during processing which may be driven by a suitably arranged drive roller 16. The rollers are carried in suitable bearings on a main frane 18. The conveyor extends through a glass treating station 20 which includes a sandblasting unit which lightly sandblasts the upwardly facing surface 22 of the glass 14. The sandblasting unit may be ay conventional sandblasting unit such as that made by Blast-It All, Inc. of Salisbury, N.C.

The apparatus further includes at an application station, generally designated B, a pair of application rollers 24 and 26 which are held on main frame 18 by means of suitable bearing brackets 28 and 30, respectively. Roller 26 is driven in rotation in the direction of conveyance of the glass sheets 14 as indicated by an arrow. Roller 26 is carried on a stationary bracket 30 while the bracket 28, which carries roller 24 is made adjustable such that the nip of the rollers may be widened varying spacing 32 to control the amount of glue deposited on roller 26 and hence on the glass sheet 14 passing beneath the rollers.

Bracket 28 includes a leg member 28a having a pair of threaded members 28b affixed thereto which are adjustably mounted relative to a leg 29a of a fixed bracket 29 by means of conventional nuts. The remaining leg (not shown) of bracket 29 has bracket 30 affixed thereto. Bracket 29 is affixed to frame 18 by any suitable means such as welding.

As can best be seen in FIG. 2, a thin layer 36 of glue is formed on the rotating roller 26. Roller 26 is spaced above the surface 22 of the glass sheet a distance which corresponds generally to the thickness of glue layer 36. As the sheet travels under the roller 26, a film of glue 39 having a thickness generally corresponding to the thickness of glue layer 36 is applied to the surface 22 of the glass sheet.

For an example, the roller 26 may be spaced about 1/16 of an inch above the surface of the glass. This will deposit a film of approximately 1/16 of an inch thickness on the glass. At a two-to-one glue solution, this will apply about 3 pounds of dry glue per square foot on the glass producing a fine chipping pattern when the glue is dried and chips off.

In order to facilitate the mass production of glue-chipped glass in a generally automated duplicative fashion, the viscosity and other properties of the animal glue solution contained in a reservoir 38 must be maintained. It has been found that a heated fluid, preferably heated water, must of necessity be utilized. The heated water maintains glue properties that will enable the glue to be applied and spread upon the glass automatically moving beneath the roller 26 in a uniform manner. This provides uniformity and duplication in the chipping pattern of glass G.

Suitable rotary pressure joints are provided at 40 on both ends of roller 26 to facilitate the flow of water therethrough while the roller is driven. Suitable free wheeling rotary pressure joints are manufactured by the Johnson Corporation of Three Rivers, Mich. Hydraulic hose and coupling are provided at 42 to facilitate the flow of heated water from a source (not shown). Any suitable means for driving roller 26 may be employed such as an electric motor 44 having a drive sprocket affixed to an output shaft thereof, and a sprocket affixed to the shaft of roller 26 and driven by a chain drive 46.

A source of animal glue solution is provided at 50 which is delivered at spaced points above the nip 34 of the rollers 24 and 26 by means of a distribution manifold 52 at a rate which maintains a desired supply of glue solution in the reservoir 38.

According to the method, the glass sheets 14 are automatically conveyed to the glass treating station 20 where the upwardly facing surface 22 of the glass sheets is lightly sandblasted and roughened. The glass sheets are then automatically conveyed to the application station B where application rollers 24 and 26 are arranged to provide a desired spacing 32 at nip 34. Source 50 of animal glue solution is maintained at a heated temperature of approximately 140 to 150 degrees Fahrenheit. The glue solution is delivered by manifold 52 to maintain reservoir 38. Roller 26 is rotated in the direction of conveyance of the glass sheets and picks up a layer 36 of glue solution which is deposited upon surface 22 of the glass sheets being conveyed therebelow. A spacing 32 is created between the rollers such that the thickness of the film on the roller 26 corresponds generally to the thickness of the film to be deposited on the glass surface passing beneath the rollers. By circulating heated water through the rollers, glue properties are maintained which facilitates uniform application on the glass sheets conveyed therebelow in a continuous automatic fashion. The glass sheets are subsequently conveyed to an oven 54 for heating whereby all the applied glue dries and chips off thereby cutting into and removing the glass to create the chipped glass pattern. Fine chipped glass patterns are uniformly duplicated in the glass sheets.

Oven 54 may be a conventional hot air oven operated as described above. The glass sheets may be automatically conveyed to the oven on conveyor 10 or may be conveyed by manual transportation such as being hand carted or carried. It has been found that water heated to a temperature in the range of 130 to 180 degrees Fahrenheit when passed through the rollers 24 and 26 maintains the glue properties as desired for mass production while a temperature of about 160 degrees Fahrenheit is preferred.

While a preferred embodiment of the invention has been described using specific terms, such description is for illustrative purposes only, and it is to be understood that changes and variations may be made without departing from the spirit or scope of the following claims.

What is claimed is:

1. A method of automated mass production of glue-chipped glass comprising the steps of:

providing a source of animal glue solution at a desired heated temperature;

placing sheets of glass upon a traveling conveyor;

automatically conveying the sheets of glass to a glass-treating station;

lightly roughening an upwardly facing surface of said glass at said glass-treating station;

providing a pair of rollers at a glue appliction station arranged to define a nip therebetween and arranging one of said rollers to be rotatably driven in the direction of conveyance of said glass;

delivering said glue solution to said nip of said rollers and maintaining a reservoir of said glue solution between said rollers;

circulating a heated fluid through said rollers for heating said rollers to a desired temperature;

automatically conveying said glass from said glass-treating station to said glue application station;

applying a thin layer of said glue solution to said rotating roller and applying said glue solution from said roller to said glass surface passing beneath said rollers;

subsequently conveying said glass and glue layer to a dryer oven causing said applied glue to chip off cutting and removing portions of said glass to produce a chipping pattern on said glass; and said glue-chipped glass sheets being automatically produced in large quantities having uniform and duplicative patterns.

2. The method of claim 1 wherein said rollers are heated to a temperature in the range of 130 to 180 degrees F.

3. The method of claim 1 wherein said rollers are heated to a temperature of about 160 degrees F.

4. The method of claim 1 wherein said heated fluid is water.

5. The glue-chipped glass product made in accordance with claim 1.

* * * * *